(12) United States Patent
Conte et al.

(10) Patent No.: US 8,981,741 B2
(45) Date of Patent: Mar. 17, 2015

(54) VOLTAGE REGULATOR FOR CONTACT-LESS ELECTRONIC DEVICES

(71) Applicant: STMicroelectronics S.r.l., Agrate Brianza (IT)

(72) Inventors: Antonino Conte, Tremestieri Etneo (IT); Carmelo Ucciardello, Catania (IT); Gianbattista Logiudice, Pedara (IT)

(73) Assignee: STMicroelectronics S.r.l., Agrate Brianza (MB) (IT)

( * ) Notice: Subject to any disclaimer, the term of this patent is extended or adjusted under 35 U.S.C. 154(b) by 166 days.

(21) Appl. No.: 13/770,047

(22) Filed: Feb. 19, 2013

(65) Prior Publication Data

US 2013/0221938 A1  Aug. 29, 2013

(30) Foreign Application Priority Data

Feb. 29, 2012 (IT) ............... MI2012A0310

(51) Int. Cl.
| | |
|---|---|
| *H02M 3/158* | (2006.01) |
| *G05F 1/10* | (2006.01) |
| *H02M 3/07* | (2006.01) |
| *G06K 19/07* | (2006.01) |

(52) U.S. Cl.
CPC . *G05F 1/10* (2013.01); *H02M 3/07* (2013.01); *H02M 3/1584* (2013.01); *G06K 19/0713* (2013.01); *G06K 19/0715* (2013.01)
USPC ......................................... 323/269; 323/350

(58) Field of Classification Search
CPC .......... H02M 3/07; H02M 3/1584; G05F 1/10
USPC ............ 323/299, 303, 269, 270, 350; 363/59, 363/65; 327/536; 257/299
See application file for complete search history.

(56) References Cited

U.S. PATENT DOCUMENTS

| | | | |
|---|---|---|---|
| 5,012,178 A * | 4/1991 | Weiss et al. ................... | 323/269 |
| 6,927,441 B2 | 8/2005 | Pappalardo et al. | |
| 6,980,045 B1 | 12/2005 | Liu | |
| 7,768,247 B2 * | 8/2010 | Sasaki et al. .................. | 323/299 |
| 8,207,719 B2 * | 6/2012 | Shiota ........................... | 323/266 |
| 2005/0012554 A1 | 1/2005 | Somerville et al. | |
| 2005/0185430 A1 | 8/2005 | Vinciarelli | |
| 2010/0033232 A1 | 2/2010 | Pan | |
| 2010/0078484 A1 | 4/2010 | Matsumoto et al. | |

* cited by examiner

*Primary Examiner* — Gary L Laxton
*Assistant Examiner* — Kyle J Moody
(74) *Attorney, Agent, or Firm* — Allen, Dyer, Doppelt, Milbrath & Gilchrist, P.A.

(57) ABSTRACT

A voltage regulator has an input terminal for receiving a supply voltage and an output terminal for providing a regulated voltage and a regulated current. Furthermore, the voltage regulator includes a regulator for generating the regulated voltage and the regulated current according to a regulation of the supply voltage. The regulator includes a plurality of regulation branches arranged between the input terminal and the output terminal, each one for providing an output voltage used for obtaining the regulated voltage and for providing an output current contributing to define the regulated current. The regulation branches are partitioned into a plurality of subsets each one including components adapted to operate within a corresponding maximum voltage different from the maximum voltage of the other subsets. In addition, the regulator includes a selector for selectively enabling the regulation branches according to an indicator of the supply voltage.

20 Claims, 4 Drawing Sheets

FIG.6

VOLTAGE REGULATOR FOR CONTACT-LESS ELECTRONIC DEVICES

FIELD OF THE INVENTION

The present invention refers to the field of electronics. More particularly, the present invention relates to voltage regulators.

BACKGROUND OF THE INVENTION

Voltage regulators are commonly used for providing a regulated voltage and current starting from a supply voltage that may be variable over time. This allows properly supplying electronic circuits that require stable voltages and currents within well-defined, ideal ranges of values.

The most widespread type of regulator is the one called a charge pump. The charge pump regulators, or simply charge pumps, are formed by a plurality of cascade-connected elementary pumping stages (each of which provides an output voltage greater than an input voltage by a substantially constant value). Each charge pump may be implemented with components (e.g., transistors and/or capacitors) capable of withstanding high voltages—referred to as "High Voltage", or HV components—or only low voltages—referred to as "Low Voltage", or LV components. In the case in which HV components are used the charge pump will have better performance with high values of the supply voltage; such a charge pump, however, involves a considerable area occupation. On the contrary, the charge pump made with LV components will have better performance with reduced values of the supply voltage; such a charge pump, however, may require protection circuits against over-voltages.

In the art there is known to provide charge pumps having selectively connectable pumping stages to adapt the number of active pumping stages according to the desired value of the regulated voltage (e.g., as described in U.S. Pat. No. 6,927,441 and U.S. 2010/033232, whose entire disclosures are herein incorporated by reference). However, such techniques may require a very complex control circuit of selection switches, to manage the connections between the pumping stages.

A typical application of voltage regulators is in portable electronic systems without a local electric energy source (e.g., batteries) for reasons of available space. Examples of such electronic systems are so-called smartcards. The smartcards have a wide distribution in the banking, transport and recognition fields, where they are used for uniquely and securely accessing dedicated services. Such portable electronic systems derive the energy required for their operation from corresponding electronic devices (or readers) that use them.

Currently, there is a development of technologies for remote interactions between these portable electronic systems and the corresponding readers without physical contact (contact-less). In the contact-less technology the electric energy for operation of the portable electronic systems is provided via radio frequency (RF) signals—i.e., electromagnetic waves. In detail, the energy associated with the carrier of the RF signals sent by each reader (provided with a transceiver for exchanging data with each portable electronic system), is absorbed by an appropriate receiver circuit of the portable electronic system that transforms it into the supply voltage.

A problem of the portable electronic systems is that the energy absorbed through the RF signals a very variable intensity over time (depending mainly on distance and obstacles between the reader and each portable electronic system). Consequently, the power supply voltage provided by the receiver circuit (from the energy absorbed) will also be variable over time (e.g., the supply voltage may vary within a range of values from 1V to 5V).

However, without a voltage supply of adequate value, the charge pump of the portable electronic device may not be able to provide the regulated voltage and the regulated current with sufficient values to allow the proper operation of the electronic circuits connected thereto. In addition, very steep variations of the values of the supply voltage may prevent a complete charging of the capacitors used in the pumping stages. Consequently, the operation of the pumping stages may be compromised, which may cause a block situation of the charge pump (i.e., the regulated voltage and current are not provided with the desired values or they are not provided at all).

This variability of the regulated voltage and current may result in incorrect operation of the circuits that receive them. The above-mentioned problem may be particularly experienced in electronic circuits, such as memories of the EEPROM and FLASH type.

SUMMARY OF THE INVENTION

In general terms, the approach according to one or more embodiments is based on the idea of selectively using different regulation branches. More specifically, an aspect of an approach according to an embodiment provides a voltage regulator comprising a plurality of regulation branches (partitioned into subsets each one comprising components adapted to operate within a corresponding maximum voltage different from that of the other subsets), which regulation branches are selectively enabled according to an indicator of the supply voltage.

Another embodiment provides a contact-less electronic device comprising such voltage regulator.

Another embodiment provides a method for operating such voltage regulator.

BRIEF DESCRIPTION OF THE DRAWINGS

An approach according to one or more embodiments, as well as additional features and its advantages will be better understood with reference to the following detailed description, given purely by way of a non-restrictive indication and without limitation, to be read in conjunction with the attached figures (wherein corresponding elements are denoted with equal or similar references and their explanation is not repeated for the sake of brevity). In this respect, it is expressly understood that the figures are not necessarily drawn to scale (with some details that may be exaggerated and/or simplified) and that, unless otherwise specified, they are simply intended to conceptually illustrate the structures and procedures described herein. In particular.

DETAILED DESCRIPTION OF THE PREFERRED EMBODIMENTS

Figure 1:
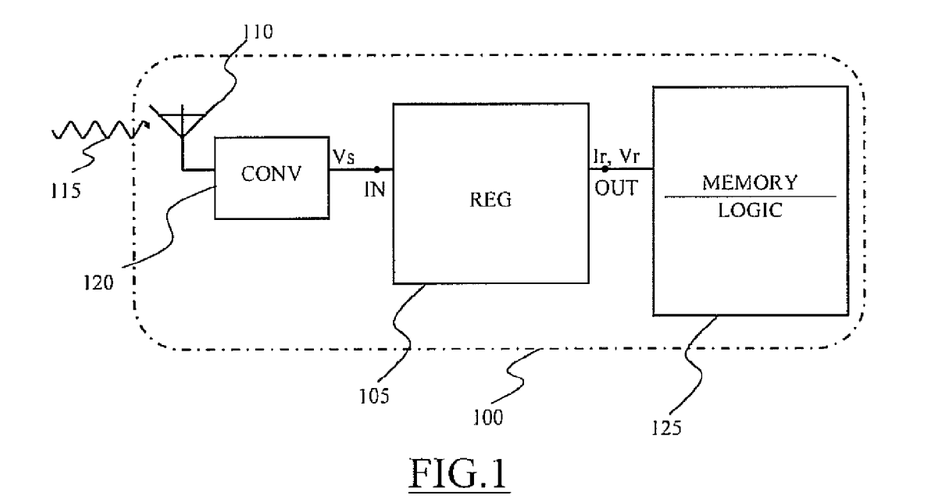
FIG. 1 is a schematic diagram illustrating an electronic system in which a voltage regulator according to an embodiment of the present invention may be used.

With reference to FIG. 1, there is schematically illustrated an electronic system, such as a smartcard 100, in which a voltage regulator (or simply regulator) 105 according to an embodiment may be used. The smartcard 100 comprises an antenna 110 adapted to receive RF signals (pictorially illustrated with a wavy line and identified by the reference number 115). A carrier of such RF signals 115 is used by a converter block 120 for generating a supply voltage Vs, which may take values within a substantially wide range with respect to a reference voltage, or ground (for example, 1 to 5V).

The converter block 120 provides the supply voltage Vs to an input terminal IN of the regulator 105, which generates a regulated voltage Vr (and provides a corresponding regulated current Ir) at its output terminal OUT, with a more stable and defined value—for example, equal to 4.5V. The regulated voltage Vr and the regulated current Ir are used for powering logic and storage circuits (typically comprising a microprocessor and a programmable memory, such as a FLASH-type memory), generally designated by the reference 125, which are connected to the terminal OUT.

Figure 2:
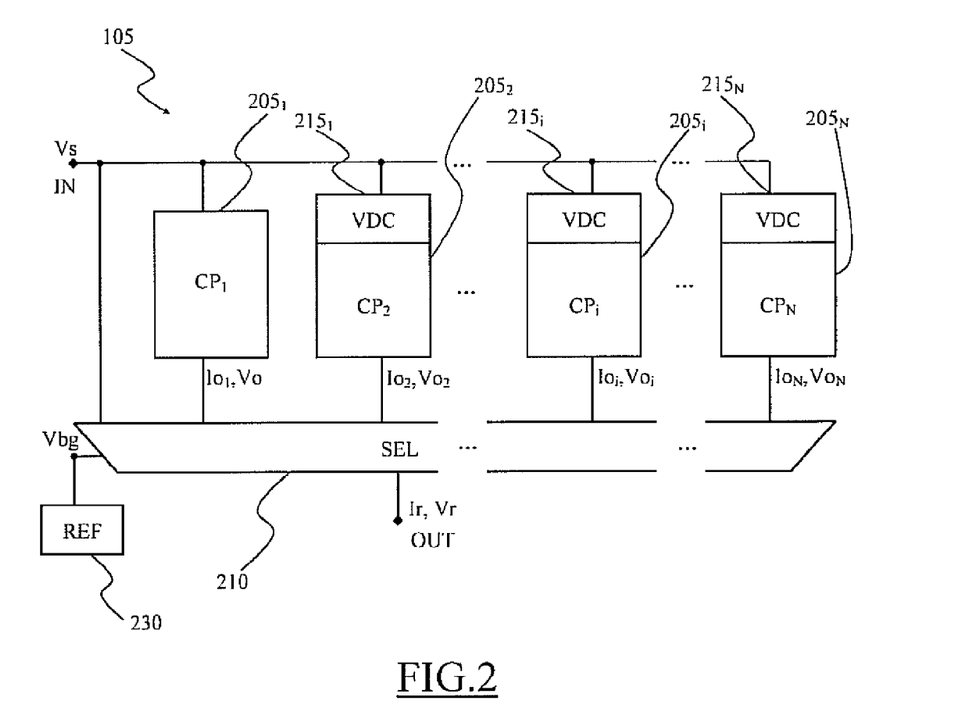
FIG. 2 is a schematic diagram illustrating the voltage regulator according to an embodiment of the present invention.

Turning now to FIG. 2, there is illustrated a block diagram of the regulator 105 according to an embodiment. In this embodiment, the regulator 105 comprises a plurality of regulation branches $205_i$ (with i=1, ..., N—for example, N=2-5), which receive the same supply voltage Vs; each regulation branch $205_i$ provides a respective output voltage $Vo_i$ (used for obtaining the regulated voltage Vr) and a respective output current $Io_i$ (which contributes to define the regulated current Ir).

The regulation branches $205_i$ are partitioned into two or more subsets, each of which comprises components (such as transistors and capacitors) adapted to operate within a corresponding maximum voltage different from the maximum voltage of the other subsets. For example, a first regulation branch $205_1$ is formed by HV components adapted to operate at high voltages (e.g., up to 10V), while the remaining (one or more) regulation branches $205_2$-$205_N$ are formed by LV components adapted to operate at low voltages (e.g., up to 3V). The regulator 105 further comprises a selector block 210, which is coupled with the input terminal IN for receiving the supply voltage Vs and with each regulation branch $205_i$ for receiving the output voltage $Vo_i$ and the output current $Io_i$. The selector block 210 is also coupled with a reference block 230 for receiving a reference voltage Vbg having low power and a substantially stable value (for example, generated by a "bandgap" circuit).

As described in detail below, the selector block 210 selectively enables the regulation branches $205_i$ according to an indicator of the supply voltage Vs. The selector block 210 is coupled with the output terminal OUT to provide the regulated voltage Vr and the regulated current Ir.

In this way, it is possible to enable the different regulation branches $205_i$ when they provide the best performance for each value of the supply voltage Vs. For example, it is possible to enable the regulation branch $205_1$ formed by HV components when the supply voltage Vs has high values, and the regulation branches $205_2$-$205_N$ formed by LV components when the supply voltage Vs has small values.

This allows providing the regulated voltage Vr and the regulated current Ir with values sufficient to allow the proper functioning of the electronic circuits connected to the output terminal OUT even against highly variable values of the supply voltage Vs. In addition, the regulator 105 is immune (or anyway less sensitive) to malfunctions due to very steep changes of the values of the supply voltage Vs. The improved stability of the regulated voltage Vr (and of the regulated current Ir) may limit the risk of compromising the proper functioning of the circuits that receive it (in particular for the FLASH memory).

For example, in the implementation illustrated in the figure each regulation branch $205_i$ comprises a corresponding charge pump $CP_i$. Each regulation branch $205_i$, with the exclusion of the first regulation branch $205_1$ (formed by HV components), also comprises a voltage converter $215_i$ interposed between the input terminal IN and the corresponding charge pump $CP_i$. The voltage converter $215_i$ reduces the supply voltage Vs to a predetermined value adapted to be supplied to the corresponding charge pump $CP_i$ (formed by LV components). Alternatively, it is possible to provide a single voltage converter (not shown) for all the charge pumps $CP_{2-N}$.

Each charge pump $CP_i$ may be divided into pumping stages (not shown in the figure), cascade-connected one to another, with each pumping stage being configured for contributing to provide the output voltage $Vo_i$. In an embodiment, the number of pumping stages of each charge pump $CP_i$ is different from the number of pumping stages of the other charge pumps $CP_j$ (j< >i). In particular, the number of pumping stages of each charge pump $CP_i$ is greater than the number of pumping stages of the previous charge pump $CP_{i-1}$ (with the exception of the first charge pump $CP_1$) and lower than the number of pumping stages of the next charge pump $CP_{i+1}$ (with the exception of the last charge pump $CP_N$). In the example at issue, the first charge pump $CP_1$ comprises a single pumping stage, the second charge pump $CP_2$ comprises two pumping stages, and so on, until the last charge pump $CP_N$ which comprises N pumping stages.

Figure 3A:
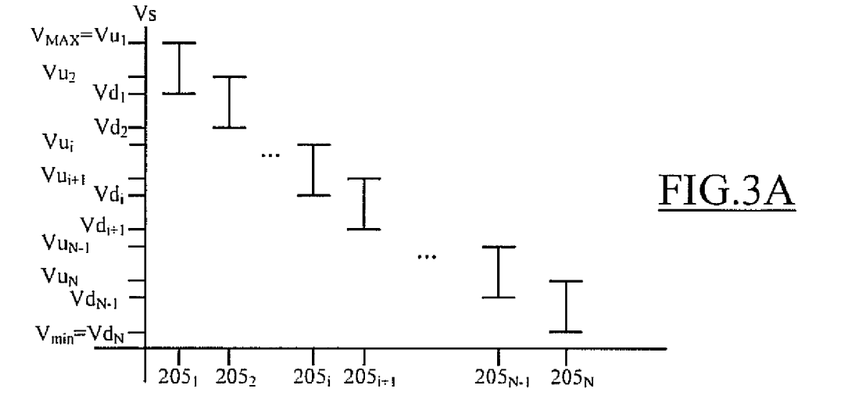
FIGS. 3A-3C are qualitative graphs relating to the operation of the voltage regulator according to an embodiment of the present invention.
Figure 3B:
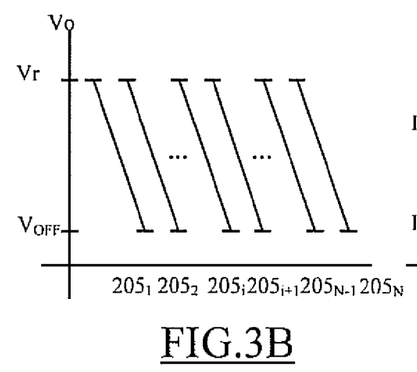
Figure 3C:
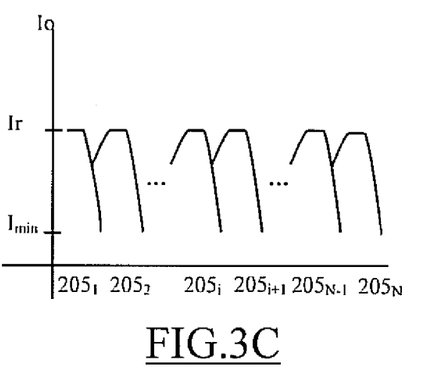

The operation of the regulator 105 according to an embodiment is now described, making joint reference to the FIG. 2 and to FIGS. 3A-3C, which illustrate qualitative graphs in which there are shown operating ranges of the supply voltage Vs, of the output voltages (indicated generally by the reference Vo) and of the output currents (indicated generally by the reference Io), respectively, of the regulation branches of the voltage regulator of FIG. 2.

Each regulation branch $205_i$ is configured for operating in an optimal way—i.e., with a power efficiency (defined by a comparison between delivered power and absorbed power) sufficiently high, for example, greater than 0.3—in a respective range of values taken by the supply voltage Vs. Each range of values is defined by an upper limit value $Vu_i$ and by a lower limit value $Vd_i$, with $Vu_i > Vd_i$. In an embodiment, these ranges of values $Vu_i$-$Vd_i$ are selected so as to be arranged in a descending sequence, with each pair of adjacent ranges of values $Vu_i$-$Vd_i$ and $Vu_{i+1}$-$Vd_{i+1}$ (with i<N) partially overlapping each other. In other words, the upper limit value of the range of values $Vu_{i+1}$-$Vd_{i+1}$ (lower in the sequence) is included in the range of values $Vu_i$-$Vd_i$ (higher in the sequence)—i.e., $Vu_i > Vu_{i+1} > Vd_i$ (as visible in FIG. 3A). Consequently, the regulation branches $205_i$ as well, may be considered logically ordered in a corresponding sequence, regardless of their physical location within the regulator 105.

In general, the selector block 210 enables each regulation branch $205_i$ (to provide its own output voltage $Vo_i$ for obtaining the regulated voltage Vr and its own output current $Io_i$ for contributing to define the regulated current Ir) when the indicator of the supply voltage Vs falls in the corresponding range of values $Vu_i$-$Vd_i$.

For example, considering the case where the supply voltage Vs decreases from a maximum value $V_{MAX}$=$Vu_1$ to a minimum value $V_{min}$=$Vd_N$. Initially, the selector block 210 only enables the first regulation branch $205_1$ (which provides the best efficiency for the value of the supply voltage Vs). When the supply voltage Vs reaches the upper limit value $Vu_2$, the selector block 210 also enables the second regulation branch $205_2$ (in addition to the regulation branch $205_1$). The regulation branches $205_1$ and $205_2$ operate in parallel until the supply voltage Vs reaches the lower limit value $Vd_1$. This ensures smooth switching between the regulation branches $205_1$ and $205_2$.

Advantageously, with the decrease of the supply voltage Vs towards the lower limit value $Vd_1$, the output voltage $Vo_1$ of the regulation branch $205_1$ decreases from a desired value of the regulated voltage Vr to a predetermined shutdown value $V_{OFF}$ (as shown in FIG. 3B and described in detail below)—with the desired value of the regulated voltage Vr that is still maintained by the output voltage $Vo_2$ of the other regulation branch $205_2$. At the same time, the output current $Io_1$—which would tend to decrease as well—is kept above a minimum value $I_{min}$ suitable for contributing, together with the output current $Io_2$ of the regulation branch $205_2$, to provide the regulated output Ir with a desired intensity, such as to ensure proper operation of the logic and storage circuits (as visible in FIG. 3C and described in detail below).

When the supply voltage Vs reaches the lower limit value $Vd_1$, the output voltage $Vo_1$ reaches the shutdown value $V_{OFF}$ and the regulation branch $205_1$ is turned off (as described in detail below), since its efficiency is excessively reduced for the value of the supply voltage Vs. Therefore, in this condition only the regulation branch $205_2$ is enabled (which now provides the best efficiency for the value of the supply voltage Vs).

The same operations described above are then repeated for the successive regulation branches $205_i$, up to the last regulation branch $205_N$ which will be enabled alone when the supply voltage reaches the upper limit value $Vu_N$ (down to the minimum value $V_{min}$=$Vd_N$).

For example, in the case of two regulation branches, the first regulation branch $205_1$ (made with HV components) may be configured for operating in an optimal manner for values of the supply voltage Vs from $V_{MAX}$=$Vu_1$=5V to $Vd_1$=2.5V, while the second regulation branch $205_2$ (made with LV components) may be configured for operating in an optimal manner for values of the supply voltage Vs from $Vu_2$=$V_{min}$=3V to $Vd_2$=1.5V.

Figure 4:
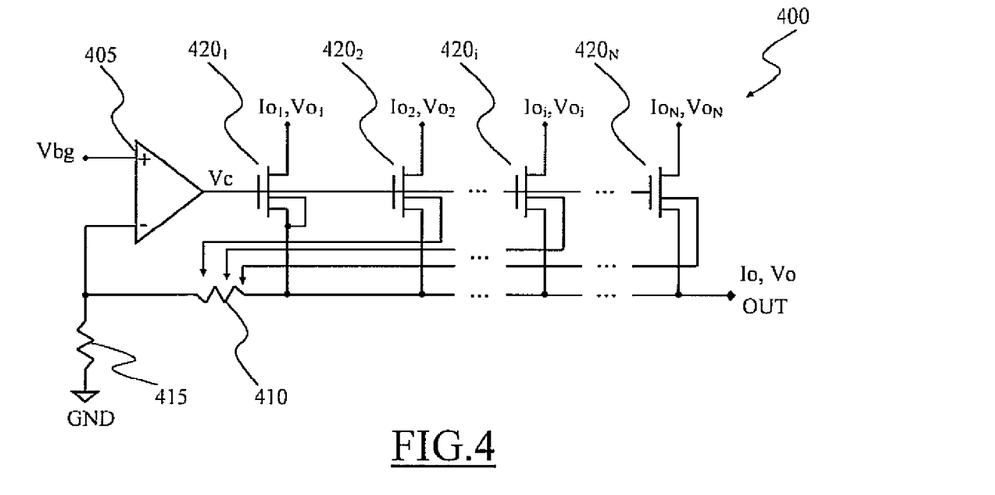
FIG. 4 is a schematic diagram illustrating a selector circuit of the voltage regulator according to an embodiment of the present invention.

Turning now to FIG. 4, there is illustrated a schematic circuit graph of a selection circuit 400 of the selector block according to an embodiment.

The selection circuit 400 comprises an operational amplifier 405, having a non-inverting input (+) that receives the reference voltage Vbg, and an inverting input (−) that is connected to the output terminal OUT via a feedback resistor 410 and is connected to a ground terminal GND (for receiving the ground voltage) via a tail resistor 415. An output terminal of the operational amplifier 405 is connected to control terminals (gates) of a plurality of transistors $420_i$ (each for a corresponding regulation branch, not shown in the figure). In the example at issue, the transistors $420_i$ are n-type MOS transistors—each of which is formed in a respective well. Each transistor $420_i$ also comprises a first conduction terminal (source) connected to the output terminal OUT, and a second conduction terminal (drain) connected to the respective regulation branch for receiving its output voltage $Vo_i$ and its output current $Io_i$.

In addition, a bulk terminal of each transistor $420_i$ receives a different bulk voltage $Vb_i$—with the exception of the transistor $420_1$ (of the first regulation branch) the bulk terminal of which is coupled with its source terminal. For this purpose, the bulk terminals of the transistors $420_i$ (i>1) are coupled with different intermediate taps of the feedback resistor 410. In this way, each transistor $420_i$ has a different threshold voltage $Vt_i$ thanks to the known body effect. In particular, the coupling between the feedback resistor 410 and the bulk terminal of each transistor $420_i$ (i>1) is configured so that its threshold voltage $Vt_i$ is greater than the threshold voltage $Vt_{i-1}$ of the transistor $420_{i-1}$. In this way, it is possible to adjust the threshold voltages $Vt_i$ in a very precise manner, since the transistors $420_i$ share similar thermodynamic characteristics, being formed one close to another.

Considering again that the supply voltage Vs initially takes the maximum value $V_{MAX}$ and then decreases to the minimum value $V_{min}$, the operation of the selection circuit 400 is now described. Initially, a feedback loop—formed by the operational amplifier 405, the resistors 410 and 415, and the transistors $420_i$—forces a control voltage Vc at the output terminal of the operational amplifier 405 such as to turn on the first transistor $420_1$ only (characterized by the lowest threshold voltage $Vt_1$). In this condition the regulated voltage Vr and the regulated current Ir are defined only by the output voltage $Vo_1$ and by the output current $Io_1$, respectively. The tail resistor 415 is adjustable (e.g., by implementing it through a variable resistance resistor, such as a trimmer) so as to set the regulated voltage Vr (and therefore the regulated current Ir) to the desired value.

When the supply voltage Vs decreases also the output voltage $Vo_1$ decreases accordingly. This also causes a reduction of the regulated voltage Vr. In turn, the reduction of the regulated voltage Vr unbalances the feedback loop 405-$420_i$, which increases the control voltage Vc to return the regulated voltage Vr to its desired value. The second threshold voltage $Vt_2$ is set in such a way to be reached by the control voltage Vc when the supply voltage Vs reaches the upper threshold value $Vu_2$. In this condition, the second transistor $420_2$ is also turned on, so that the output voltage $Vo_1$ and the output current $Io_2$ are added to the output voltage $Vo_1$ and to the output current $Io_1$, respectively, for defining the regulated voltage Vr and the regulated current Ir, respectively.

The operation of the selection circuit 400 then continues with the sequential turning on of each transistor $420_i$, in conjunction with the exceeding of the respective threshold voltage $Vt_i$ by the control voltage Vc (in correspondence with the upper threshold voltage $Vu_i$). In this way the selection circuit 400 allows controlling the enabling of the regulation branches $205_i$ in a very simple manner with a passive structure (i.e., made in an analog form without any dedicated logic circuitry).

Figure 5:
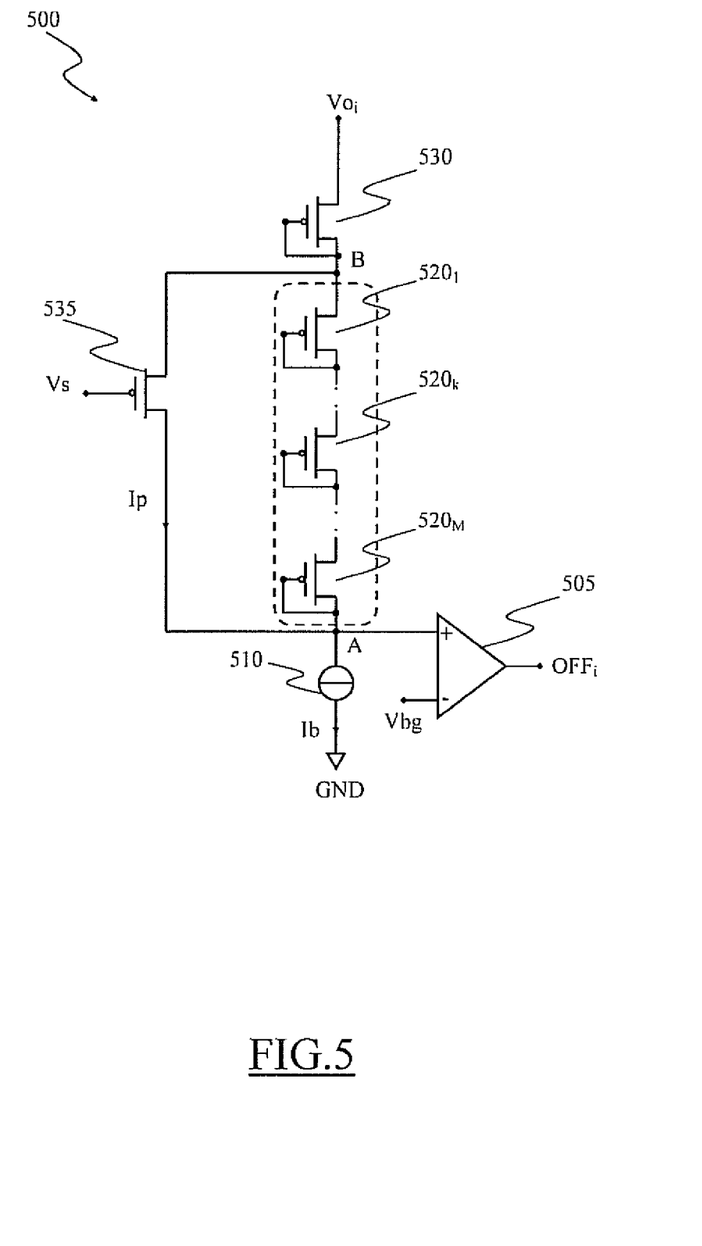
FIG. 5 is a schematic diagram illustrating a shutdown circuit of a regulation branch of the voltage regulator according to an embodiment of the present invention.

Referring now to FIG. 5, there is illustrated a schematic circuit graph of a shutdown circuit 500 of a regulation branch according to an embodiment. The same shutdown circuit 500 is provided for each of the regulation branches (not shown in the figure), with the exception of the last regulation branch.

In detail, the shutdown circuit 500 comprises a voltage limiter commonly used in known charge pumps. In particular, this voltage limiter comprises a comparator 505, which provides a shutdown signal $OFF_i$ (i>1) for the corresponding charge pump to its output terminal. An inverting terminal (−)

of the comparator 505 receives the reference voltage Vbg, while a non-inverting terminal (+) thereof is connected to a circuit node A. A constant current generator 510 (e.g., a suitably biased transistor) is connected between the circuit node A and the ground terminal GND for providing a bias current Ib.

Furthermore, a stack of transistors $520_k$ (with k=1, . . . , M, for example, M=2-5) in a diode configuration is connected to the circuit node A. Each transistor $520_k$ is a p-type MOS transistor having a gate terminal connected to its own drain terminal, which is in turn connected to a source terminal of the next transistor $520_{k+1}$ in the stack. A last transistor $520_M$ of the stack has its drain terminal connected to the circuit node A, while a first transistor $520_1$ of the stack has its source terminal connected to another circuit node B. An input transistor 530 (of p-channel MOS type as well) has a drain terminal and a gate terminal interconnected to each other (in diode configuration) and to the circuit node B, and a source terminal for receiving the output voltage $Vo_i$ (i>1) from the corresponding charge pump.

In the approach according to an embodiment, the shutdown circuit 500 adds (to the voltage limiter 505-530 described above) a bridge transistor 535 (of p-channel MOS type), which has a drain terminal connected to the circuit node B and a source terminal connected to the circuit node A (in parallel to the transistor stack $520_k$). A gate terminal of the transistor 535 receives the supply voltage Vs.

Referring again to the case where the supply voltage Vs initially takes the maximum value $V_{MAX}$ and then decreases to the minimum value $V_{min}$, the operation of the shutdown circuit 500 is now described. In the normal operation of the charge pump (i.e., when the supply voltage Vs is between the corresponding upper limit value $Vu_i$ and the upper limit value $Vu_{i+1}$ of the next regulation branch), it tends to continuously increase the output voltage $Vo_i$. The voltage limiter 505-530 is dimensioned so as to ensure that the output voltage $Vo_i$ does not exceed a target value (corresponding to the desired value of the regulated voltage Vr)—while the transistor 535 is always off (so that it does not interfere with its operation). In particular, as soon as the output voltage $Vo_i$ reaches a value able to bring the transistors $520_k$, 530 into conduction, the bias current Ib begins to flow through them, thereby determining the value of an operating voltage $Vn_{in}$ between the conduction terminals of the input transistor 530 and of an operating voltage Vn between the conduction terminals of each transistor $520_k$ (substantially equal to each other). Consequently, a voltage $V_A$ at the circuit node A is equal to:

$$V_A = Vo_i - [M \cdot Vn(Ib) + Vn_{in}(Ib)].$$

The transistors $520_k$, 530 and the bias current Ib are set so as to maintain the voltage $V_A$ at the circuit node A lower than the reference voltage Vbg as long as the output voltage $Vo_i$ is lower than the desired value of the regulated voltage Vr (with the bias current Ib as low as possible for limiting a corresponding waste of energy). When the output voltage $Vo_i$ exceeds the desired value of the regulated voltage Vr, the voltage $V_A$ exceeds the reference voltage Vbg. Consequently, the comparator 505 asserts the signal $OFF_i$ at its output terminal, so as to shutdown the charge pump as long as the value of the output voltage $Vo_i$ drops again to the desired value of the regulated voltage Vr (e.g., due to an energy consumption by the circuit connected to the output terminal of the regulator). At this point, the voltage $V_A$ falls below the reference voltage Vbg, so that the signal $OFF_i$ is again de-asserted, thereby turning on the charge pump again. Consequently, the output voltage $Vo_i$ will oscillate slightly around its target value.

In the approach according to an embodiment, the shutdown circuit 500 is configured to turn on the transistor 535 when the supply voltage Vs reaches the upper limit value $Vu_{i+i}$ (i.e., when the efficiency of the charge pump begins to drop). This is possible by sizing the transistor 530 so that the circuit node B is brought to a voltage slightly lower than the upper limit value $Vu_{i+1}$ plus a threshold voltage $Vt_b$ of the transistor 535 (i.e., its operating voltage Vn is slightly greater than the difference between the target value of the output voltage $Vo_i$ and the voltage $Vu_{i+1}+Vt_b$).

When the bridge transistor 535 turns on, it is crossed by a corresponding current Ip, which increases in intensity with the decreasing of the supply voltage Vs. Consequently, the current through the transistors $520_k$ decreases (while the current through the transistor 530 remains unchanged). In particular, the transistors $520_k$ are now crossed by a current equal to the difference between the bias current Ib and the current Ip (i.e., Ib−Ip). In this way, the operating voltage of each transistor $520_k$ drops to a value Vn'<Vn. Therefore, the voltage $V_A$ increases by the amount M·(Vn−Vn'), so that it exceeds the reference voltage Vbg (thereby causing the assertion of the signal $OFF_i$ that shuts down the charge pump) as soon as the output voltage $Vo_i$ exceeds a value lower by such quantity than the desired value of the regulated voltage Vr. In other words, the voltage limiter 505-530 maintains the output voltage $Vo_i$ at a target value lower than the normal case. This allows operating the charge pump with a reduced output voltage $Vo_i$ when the supply voltage is too low for ensuring its optimal performance, to allow it to provide an output current $Io_i$ still of considerable value.

The transistor 530 is sized so that the current Ip becomes equal to the bias current Ib when the supply voltage Vs reaches the lower limit value $Vd_i$. At this point, the transistors $520_k$ are switched off, so that the voltage $V_A$ is brought substantially to the value $Vo_i - Vn_{in}$. This value is always higher than the reference voltage Vbg, so that the signal $OFF_i$ remains asserted thereby causing the definitive shutdown of the charge pump.

Figure 6:
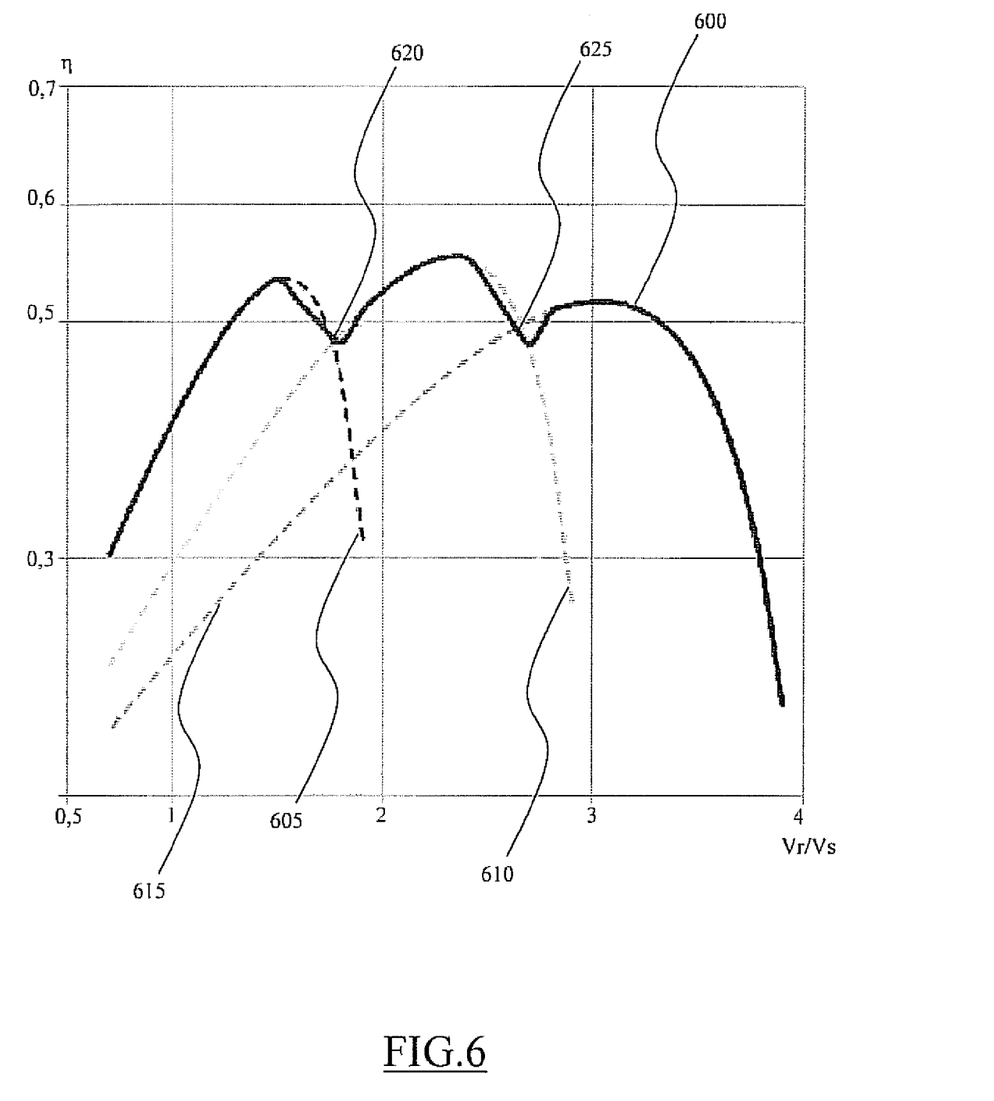
FIG. 6 is a graph of the trend of the efficiency of a voltage regulator according to an embodiment of the present invention.

Turning now to FIG. 6, there is a graph showing a trend of the efficiency η of the regulator according to an embodiment as a function of a ratio between the regulated voltage Vr and the supply voltage Vs (Vr/Vs). In detail, the trend of the efficiency η of the entire controller is represented by a solid line curve 600. The curve 600 refers to a regulator according to an embodiment comprising three regulation branches. In particular, a first regulation branch comprises a charge pump with one single pumping stage made with HV components. A second regulation branch comprises a charge pump having two pumping stages made with LV components. Finally, a third regulation branch comprises a charge pump having three pumping stages made with LV components.

In the graph there are also indicated respective efficiency trends of each one of the three regulation branches. In particular, the first regulation branch has an efficiency trend represented by a dotted line curve 605, the second regulation branch has an efficiency trend represented by a dotted line curve 610 and the third regulation branch has an efficiency trend represented by a dotted line curve 615.

As is evident, the efficiency trend 600 of the controller substantially follows the trend of the efficiency of the charge pump having the largest value for each value of the ratio between the regulated voltage Vr and the supply voltage Vs. In particular, with the increase of the voltages ratio Vr/Vs the curve 600 firstly follows the curve 605 (first regulation branch enabled), then the curve 610 (second regulation branch enabled), and then the curve 615 (third regulation branch enabled). It should be noted that, in the regulator according to an embodiment, during the transition (indicated by the reference 620) from the enabling of the first regulation branch to the enabling of the second regulation branch and, in a similar way, during the transition (indicated by the reference 625) from the enabling of the second regulation branch to the enabling of the third regulation branch, the curve 600 varies in a continuous manner without abrupt changes. This ensures a robust and reliable operation of the regulator.

Naturally, to satisfy local and specific requirements, a person skilled in the art may apply to the approach described above many logical and/or physical modifications and alterations. More specifically, although this approach has been described with a certain degree of particularity with reference to one or more embodiments thereof, it should be understood that various omissions, substitutions and changes in the form and details as well as other embodiments are possible. Particularly, different embodiments may even be practiced without the specific details (such as the numerical examples) set forth in the preceding description to provide a more thorough understanding thereof. Conversely, well-known features may have been omitted or simplified in order not to obscure the description with unnecessary particulars. Moreover, it is expressly intended that specific elements and/or method steps described in connection with any embodiment of the disclosed approach may be incorporated in any other embodiment. In any case, the terms including, comprising, having and containing (and any of their forms) should be understood with an open and non-exhaustive meaning (i.e., not limited to the recited elements), the terms based on, dependent on, according to, function of (and any of their forms) should be understood as a non-exclusive relationship (i.e., with possible further variables involved) and the term a should be understood as one or more elements (unless expressly stated otherwise).

For example, an embodiment proposes a voltage regulator. The voltage regulator has an input terminal for receiving a supply voltage and an output terminal for providing a regulated voltage and a regulated current. Furthermore, the voltage regulator comprises regulation means or circuitry for generating the regulated voltage and the regulated current according to a regulation of the supply voltage. In the approach according to an embodiment, the regulation means or comprises a plurality of regulation branches arranged between the input terminal and the output terminal each one for providing an output voltage used for obtaining the regulated voltage and for providing an output current contributing to define the regulated current. The regulation branches are partitioned into a plurality of subsets, each one comprising components adapted to operate within a corresponding maximum voltage different from the maximum voltage of the other subsets. Selection means or circuitry is provided for selectively enabling the regulation branches according to an indicator of the supply voltage.

However, similar considerations apply if the regulator has a different structure or comprises equivalent components, or it has other characteristics of operation. In any case, any of its components may be separated into several elements, or two or more components may be combined into a single element. In addition, each component may be replicated to support the execution of the corresponding operations in parallel. It should also be noted that (unless stated otherwise) any interaction between different components generally need not to be continuous, and may be either direct or indirect via one or more intermediaries.

In any case, the supply voltage, the regulated voltage and the regulated current may take any other value. Moreover, the regulation branches may be in any other number, and they may be implemented in any other way (even without charge pumps). Similarly, the regulation branches may be partitioned into any number of subsets (two or more), each of which comprises any number of regulation branches (one or more). In any case, the selection of the regulation branches may be controlled according to any other indicator of the supply voltage (see below).

In an embodiment of the voltage regulator, each regulation branch comprises a corresponding number of regulation stages coupled in cascade between the input terminal and the output terminal each one for contributing to provide the regulated voltage. The number of regulation stages of each regulation branch is different from the number of regulation stages of the other regulation branches.

However, the regulation branches may comprise different regulation stages, in any number (even in non-linear progression). In any case, nothing prevents having some of the regulation branches (up to all) with the same number of regulation stages.

In an embodiment of the voltage regulator, the selection means is configured for enabling each regulation branch when the indicator of the supply voltage falls within a corresponding range of values having a lower limit value and an upper limit value. The ranges of values are ordered in a sequence with each adjacent pair of ranges of values in the sequence partially overlapped therebetween (with the upper limit value of one of the adjacent ranges of values comprised in the other of the adjacent ranges of values).

However, the ranges of values may take any other extent, and they may be arranged in any other way (even with more than two ranges of values overlapping each other).

In an embodiment of the voltage regulator, the indicator of the supply voltage comprises the output currents of all the regulation branches and the selection means or circuitry comprises enabling means or circuitry for selectively enabling each regulation branch according to the corresponding output current. However, nothing prevents using different indicators of the supply voltage (e.g., a direct measure thereof).

In an embodiment of the voltage regulator, to the lower limit value of each range of values corresponds a lower intensity limit of the respective output current. The enabling means or circuitry comprises a switching element for each regulation branch, and control means or circuitry for isolating each regulation branch from the output terminal when the corresponding output current is lower than the corresponding lower intensity limit and for coupling the regulation branch to the output terminal otherwise. However, the switching elements may be of any other type, and it is possible to provide a single switching element for more than one regulation branch. In addition, the control means or circuitry may be configured for disabling each regulation branch for a different intensity of the output current.

In an embodiment of the voltage regulator, each switching element comprises a transistor having a threshold voltage corresponding to the respective lower limit value, and the control means or circuitry comprises means for providing a common control signal to all the transistors according to a comparison between the regulated voltage and a reference voltage. However, it is possible to use different transistors (e.g., of BJT-type), or a dedicated control signal for each regulation branch or for subsets thereof. In any case, the possibility of using a digital control system is not excluded.

In an embodiment of the voltage regulator, each regulation branch other than the regulation branch corresponding to the range of values having the lowest limit value, further comprises shutdown means or circuitry for shutting down the regulation branch when the supply voltage is lower than the corresponding lower limit value. However, it is possible to shutdown all the regulation branches (also comprising the regulation branch corresponding to the values having the lowest limit value), or vice versa to leave all of them turned on but simply disabled.

In an embodiment of the voltage regulator, the shutdown means or circuitry comprises means or circuitry for reducing the corresponding output voltage when the indicator of the supply voltage is lower than the upper limit value of the corresponding adjacent range of values. However, nothing prevents reducing the output voltage when the indicator of the supply voltage has a value other than such upper limit value. In any case, such a feature may even be omitted in a simplified implementation of the voltage regulator.

In an embodiment of the voltage regulator, the shutdown means or circuitry comprises a comparator having an output terminal (for providing a shutdown signal for shutting down the corresponding regulation branch), a first comparator terminal (for receiving a further reference voltage) and a second comparator terminal. A stack of diode-like elements is coupled between the second comparator terminal and an output terminal of the corresponding regulation branch (for receiving the output voltage). A current generator is coupled between the second comparator terminal and a reference terminal for providing a bias current to the stack of diode-like elements. The bias current forces an operating voltage at the stack of diode-like elements such as to cause the assertion of the shutdown signal when the output voltage exceeds a target value (corresponding to a desired value of the regulated voltage). A further switch element is coupled in parallel with a portion of the stack of diode-like elements. The further switch element has a control terminal for receiving the supply voltage for draining part of the bias current when the supply voltage is lower than the upper limit value of the corresponding adjacent range of values (thereby reducing the operating voltage of the portion of the stack of diode-like elements so as to cause the assertion of the shutdown signal when the output voltage exceeds a value correspondingly reduced with respect to the target value), and for draining the whole bias current when the supply voltage is lower than the lower limit value of the corresponding range of values (thereby causing the assertion of the shutdown signal).

However, the stack of diode-like elements may comprise subsets (each one comprising one or more transdiode-like elements) of diode-like elements having operating characteristics different from each other. Moreover, the diode-like elements may be in a different number (both between the output terminal and the further switch element and in parallel to the further switch element). The diode-like elements and the further switch element may be made in any other way (e.g., with BJT transistors). In any case, the possibility of implementing the shutdown means or circuitry through other circuits (even logical-type ones) is not excluded.

A different aspect of the approach proposes a contact-less electronic device. The contact-less electronic device comprises the voltage regulator described above, and means or circuitry for receiving a radio frequency signal and generating the supply voltage for the voltage regulator from the radio-frequency signal. However, the contact-less electronic device may be of any other type (for example, a smartcard or an RFID—Radio Frequency IDentification—device). Moreover, the contact-less electronic device may be configured for receiving a supply voltage from other sources as well (e.g., through a suitable physical-contact terminal). In any case, the voltage regulator may be used in any other system (e.g., normally powered by batteries).

A different aspect of the approach proposes a method for operating a voltage regulator. The method comprises the following steps. A supply voltage is received at an input terminal. A regulated voltage and a regulated current are provided to an output terminal. The regulated voltage and the regulated current are generated according to a regulation of the supply voltage. The step of providing a regulated voltage and a regulated current comprises selectively enabling a plurality of regulation branches according to an indicator of the supply voltage. The regulation branches are arranged between the input terminal and the output terminal each one for providing an output voltage used for obtaining the regulated voltage and for providing an output current contributing to define the regulated current. The regulation branches are partitioned into a plurality of subsets each one comprising components adapted to operate within a corresponding maximum voltage different from the maximum voltage of the other subsets.

However, similar considerations apply if the same approach is implemented with an equivalent process (using similar steps with the same functions of more steps or portions thereof, removing some unessential steps, or adding further optional steps). Moreover, the steps may be executed in different order, in parallel or overlapped (at least in part).

That which is claimed:

1. A voltage regulator comprising:
an input terminal configured to receive a supply voltage;
an output terminal configured to provide a regulated voltage and a regulated current;
a regulation circuit configured to generate the regulated voltage and the regulated current based upon a regulation of the supply voltage, and comprising
a plurality of regulation branches arranged between the input terminal and the output terminal each regulation branch for providing an output voltage used to obtain the regulated voltage and for providing an output current contributing to define the regulated current, the plurality of regulation branches being divided into a plurality of subsets each subset comprising components configured to operate within a corresponding maximum voltage different from a maximum voltage of other subsets, and
a selection circuit configured to select at least one of the regulation branches based upon an indicator of the supply voltage and to enable each regulation branch when the indicator of the supply voltage falls within a corresponding range of values, wherein each range of values partially overlaps with an adjacent range of values.

2. The voltage regulator according to claim 1, wherein each regulation branch comprises a corresponding number of regulation stages coupled in cascade between the input terminal and the output terminal and each one contributing to provide the regulated voltage, the number of regulation stages of each regulation branch being different from a number of regulation stages of other regulation branches.

3. The voltage regulator according to claim 1, wherein the indicator of the supply voltage comprises the output currents of all the regulation branches, the selection circuit comprising an enabling circuit configured to selectively enable each regulation branch according to a corresponding output current.

4. The voltage regulator according to claim 3, wherein the lower limit value of each range of values corresponds to a lower intensity limit of a respective output current, the enabling circuit comprising a switching element for each regulation branch, and a control circuit configured to isolate each regulation branch from the output terminal when the corresponding output current is lower than the corresponding lower intensity limit and to couple the regulation branch to the output terminal otherwise.

5. The voltage regulator according to claim 4, wherein each switching element comprises a transistor having a threshold voltage corresponding to a respective lower limit value, and wherein the control circuit comprises a comparator configured to provide a common control signal to all transistors based upon a comparison between the regulated voltage and a reference voltage.

6. The voltage regulator according to claim 1, wherein each regulation branch other than the regulation branch corresponding to the range of values having the lowest lower limit value further comprises a shutdown circuit configured to shut down a respective regulation branch when the supply voltage is lower than the corresponding lower limit value.

7. The voltage regulator according to claim 6, wherein the shutdown circuit comprises a reduction circuit configured to reduce the corresponding output voltage when the indicator of the supply voltage is lower than the upper limit value of the corresponding adjacent range of values.

8. The voltage regulator according to claim 7, wherein the shutdown circuit comprises a comparator having an output terminal to provide a shutdown signal for shutting down the corresponding regulation branch, a first comparator terminal to receive a further reference voltage and a second comparator terminal, a stack of diode-type elements coupled between the second comparator terminal and an output terminal of the corresponding regulation branch to receive the output voltage, a current generator coupled between the second comparator terminal and a reference terminal to provide a bias current to the stack of diode-type elements, the bias current forcing an operating voltage at the stack of diode-type elements such as to cause an assertion of the shutdown signal when the output voltage exceeds a target value corresponding to a desired value of the regulated voltage, and an additional switch element coupled in parallel to a portion of the stack of diode-type elements, the additional switch element having a control terminal for receiving the supply voltage to drain part of the bias current when the supply voltage is lower than the upper limit value of the corresponding adjacent range of values thereby reducing the operating voltage of the portion of the stack of diode-type elements so as to cause the assertion of the shutdown signal when the output voltage exceeds a value correspondingly reduced with respect to the target value and for completely draining the bias current when the supply voltage is lower than the lower limit value of the corresponding range of values thereby causing the assertion of the shutdown signal.

9. A contact-less electronic device comprising:
a voltage regulator; and
a receiver configured to receive a radio-frequency signal and generate a supply voltage for the voltage regulator from the radio-frequency signal;
the voltage regulator comprising
an input terminal configured to receive the supply voltage, and an output terminal configured to provide a regulated voltage and a regulated current,
a regulation circuit configured to generate the regulated voltage and the regulated current based upon a regulation of the supply voltage, and comprising
a plurality of regulation branches arranged between the input terminal and the output terminal each regulation branch for providing an output voltage used to obtain the regulated voltage and for providing an output current contributing to define the regulated current, the plurality of regulation branches being divided into a plurality of subsets each subset comprising components configured to operate within a corresponding maximum voltage different from a maximum voltage of other subsets, and
a selection circuit configured to select at least one of the regulation branches based upon an indicator of the supply voltage and to enable each regulation branch when the indicator of the supply voltage falls within a corresponding range of values, wherein each range of values partially overlaps with an adjacent range of values.

10. The contact-less electronic device according to claim 9, wherein each regulation branch comprises a corresponding number of regulation stages coupled in cascade between the input terminal and the output terminal and each one contributing to provide the regulated voltage, a number of regulation stages of each regulation branch being different from the number of regulation stages of the other regulation branches.

11. The contact-less electronic device according to claim 9, wherein the indicator of the supply voltage comprises the output currents of all the regulation branches, the selection circuit comprising an enabling circuit configured to selectively enable each regulation branch according to a corresponding output current.

12. The contact-less electronic device according to claim 11, wherein the lower limit value of each range of values corresponds to a lower intensity limit of a respective output current, the enabling circuit comprising a switching element for each regulation branch, and a control circuit configured to isolate each regulation branch from the output terminal when the corresponding output current is lower than the corresponding lower intensity limit and to couple the regulation branch to the output terminal otherwise.

13. The contact-less electronic device according to claim 12, wherein each switching element comprises a transistor having a threshold voltage corresponding to a respective lower limit value, and wherein the control circuit comprises a comparator configured to provide a common control signal to all transistors based upon a comparison between the regulated voltage and a reference voltage.

14. The contact-less electronic device according to claim 9, wherein each regulation branch other than the regulation branch corresponding to the range of values having the lowest lower limit value further comprises a shutdown circuit configured to shut down a respective regulation branch when the supply voltage is lower than the corresponding lower limit value.

15. The contact-less electronic device according to claim 14, wherein the shutdown circuit comprises a reduction circuit configured to reduce the corresponding output voltage when the indicator of the supply voltage is lower than the upper limit value of the corresponding adjacent range of values.

16. A method for operating a voltage regulator comprising:
receiving a supply voltage at an input terminal; and
providing a regulated voltage and a regulated current to an output terminal, the regulated voltage and the regulated current being generated based upon a regulation of the supply voltage, and comprising
selectively enabling a plurality of regulation branches according to an indicator of the supply voltage when the indicator of the supply voltage falls within a corresponding range of values, wherein each range of values partially overlaps with an adjacent range of values, wherein the plurality of regulation branches are arranged between the input terminal and the output terminal each regulation branch configured to provide an output voltage used for obtaining the regulated voltage and for providing an output current contributing to define the regulated current, the plurality of regulation branches being divided into a plurality of subsets each subset comprising components configured to operate within a corresponding maximum voltage different from a maximum voltage of other subsets.

17. The method according to claim 16, wherein each regulation branch comprises a corresponding number of regulation stages coupled in cascade between the input terminal and the output terminal and each one contributing to provide the regulated voltage, the number of regulation stages of each regulation branch being different from a number of regulation stages of the other regulation branches.

18. The method according to claim 16, wherein the indicator of the supply voltage comprises the output currents of all the regulation branches, the selection component comprising an enabling circuit configured to selectively enable each regulation branch according to a corresponding output current.

19. The method according to claim 18, wherein the lower limit value of each range of values corresponds to a lower intensity limit of a respective output current, the enabling circuit comprising a switching element for each regulation branch, and a control circuit configured to isolate each regulation branch from the output terminal when the corresponding output current is lower than the corresponding lower intensity limit and to couple the regulation branch to the output terminal otherwise.

20. The method according to claim 19, wherein each switching element comprises a transistor having a threshold voltage corresponding to a respective lower limit value, and wherein the control circuit comprises a comparator configured to provide a common control signal to all transistors based upon a comparison between the regulated voltage and a reference voltage.

* * * * *